United States Patent [19]

Cretel

[11] Patent Number: 4,789,007
[45] Date of Patent: Dec. 6, 1988

[54] METHOD OF MAKING COMPOUND PIPES FOR CONVEYING VARIOUS FLUIDS AND PIPE OBTAINED BY THIS METHOD

[76] Inventor: Jacques L. Cretel, 2 rue de la Solette Raray, 60810 Barbery, France

[21] Appl. No.: 106,408

[22] Filed: Oct. 8, 1987

[30] Foreign Application Priority Data

Oct. 9, 1986 [FR] France .............................. 86 14069

[51] Int. Cl.$^4$ ............................................. F16L 09/04
[52] U.S. Cl. .................... 138/174; 138/125; 138/127; 174/47; 156/275.5
[58] Field of Search ............... 138/125, 126, 127, 138; 156/275.5, 273.7, 272.2, 273.3, 149, 274.2; 264/258, 512, 513, 521; 174/47

[56] References Cited

U.S. PATENT DOCUMENTS

| | | | |
|---|---|---|---|
| 459,536 | 9/1891 | Simon | 156/149 |
| 1,190,292 | 7/1916 | Hopkins | 156/149 X |
| 1,339,736 | 5/1920 | Burke | 156/275.5 X |
| 2,019,709 | 11/1935 | Kennedy | 156/149 |
| 2,243,506 | 5/1941 | Mitchell | 156/275.5 X |
| 3,235,289 | 2/1986 | Jones | 156/274.2 |
| 3,290,197 | 12/1966 | Carmody | 156/275.5 |
| 3,348,640 | 10/1967 | Thompson et al. | 156/275.5 X |
| 3,776,794 | 12/1973 | Ingham | 156/149 X |
| 4,602,148 | 7/1986 | Ramsey | 156/272.2 X |
| 4,684,789 | 8/1987 | Eggleston | 156/272.2 X |

FOREIGN PATENT DOCUMENTS

| | | |
|---|---|---|
| 558037 | 6/1957 | Belgium . |
| 0087855 | 9/1983 | European Pat. Off. . |
| 2353568 | 5/1975 | Fed. Rep. of Germany . |
| 537550 | 5/1973 | Switzerland . |
| 1450127 | 9/1976 | United Kingdom . |

Primary Examiner—James E. Bryant, III
Attorney, Agent, or Firm—Steinberg & Raskin

[57] ABSTRACT

A method of making a tube for carrying various fluids and materials, the tube comprising from the inside to the outside a layer of impervious plastics material, a first layer of glass fibers connected to the impervious layer, a layer of electrically conducting material and a second layer of glass fibers, the three lastly named layers being impregnated with a resin polymerized through heating of the layer of electrically conducting material which may be a heating metal wire resistor.

1 Claim, 1 Drawing Sheet

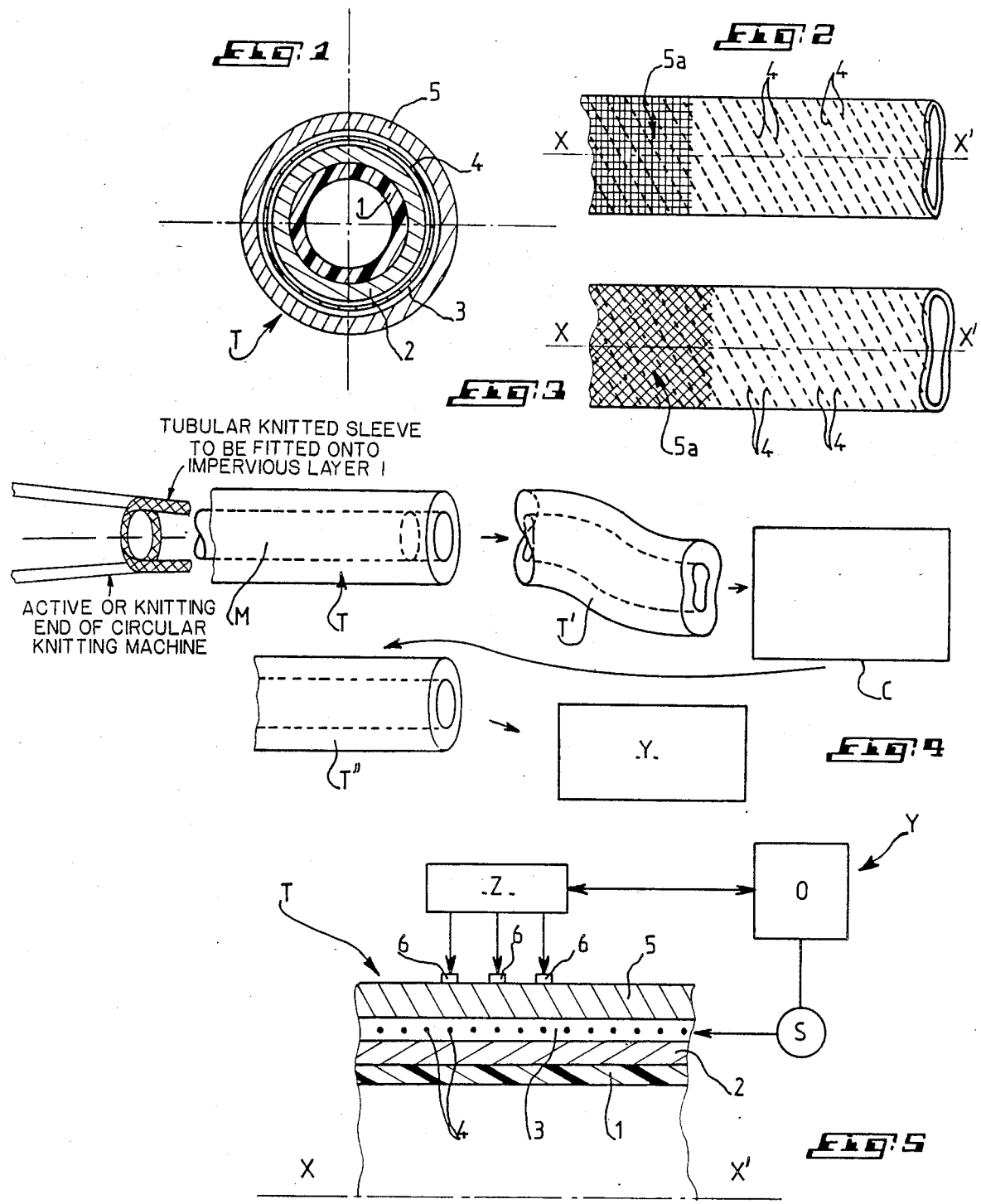

METHOD OF MAKING COMPOUND PIPES FOR CONVEYING VARIOUS FLUIDS AND PIPE OBTAINED BY THIS METHOD

BACKGROUND OF THE INVENTION

The present invention relates essentially to a method of manufacturing pipes and in particular compound tubes for conveying or carrying various materials or fluids of any kinds.

It is also directed to a pipe or tube obtained through this method.

There are already known tubes or pipes made from glass fibers and resin, these tubes being insertable and inflatable or expandable in a damaged pipeline with the purpose of lining and thereby restoring the inner wall of this pipeline. This kind of tubes or pipes is made from compound sheet materials the edges of which are welded or sewn or stitched thereby imparting a weakness to the tubes at the line of seam or weld. In other words, upon inflating or expanding the tube or pipe, the latter would necessarily exhibit weak spots along a line corresponding to a generating line of the tube. Moreover, this kind of tube once positioned inside of the pipeline and lining or facing its inner wall would constitute a somewhat lost tube. In other words, it may not be recovered for carrying out for instance the inner lining or facing of another pipeline after repair of the pipeline provisionally containing the tube.

Furthermore, there are long known rigid tubes or stiff pipelines made from polyvinyl chloride for instance which are used for carrying or conveying various gases or liquids. These tubes however while being rigid and strong, i.e. without any weak spot, may not be used as a provisional or final inner lining or facing of damaged pipelines.

SUMMARY OF THE INVENTION

The object of the present invention is in particular to remove the above-mentioned inconvenience by providing a tube which may be made in a continuous fashion very quickly and at a low cost price, which exhibits high mechanical characteristics at any point and thoughout its length and which may be used not only as a tube for internally lining damaged ducts or pipelines but also as a conventional rigid tube like the presently prefabricated tubes to carry various materials or fluids.

For this purpose, the subject matter of the invention is a method of making tubes of any cross-section for conveying fluids also of any kind, comprising covering a mandrel with a layer of plastics material, effecting a continuous circular weaving of several concentric tubular layers onto said plastic layer, then impregnating by means of a resin the whole of said tubular layers and causing the polymerization of this resin through a heating integrated into the tubular layers.

According to another characterizing feature of this method, at least one metal layer reinforcing or strengthening the tube and also serving as a heating resistor means for polymerizing the resin is inserted between the aforesaid tubular layers.

According to still another characterizing feature of this method, the heating temperature of the resin is detected or sensed so as to control or adjust the supply of electric current to said metal layer.

It should also be pointed out that after leaving the mandrel and subsequent impregnation with the resin, the tube is shaped through inflation or expansion preferably prior to heating.

The invention is also directed to a tube or pipe for conveying any fluids, obtained through the method according to either one of the foregoing characterizing features and of the kind comprising at least one layer of glass fibers impregnated with a resin, this tube being characterized by comprising at least one assembly of successive concentric layers, namely from the inside towards the outside : a layer of impervious plastics material, a first layer of glass fibers made fast with the aforesaid layer, a layer of electrically conducting material such for instance as a metal and a second layer of glass fibers, the three lastly cited layers being impregnated with resin.

According to a further characterizing feature of this tube, the aforesaid layer of conducting material consists of a spirally shaped metal wire interposed between the first and the second layers of glass fibers.

The tube according to this invention is further characterized by an orthogonal interlacing or binding or interweaving of the glass fibers, this binding being oriented skewwise or along the grain with respect to the axis of the tube.

The latter further comprises, according to the invention, a plurality of thermal probes likely to control or adjust the supply of electric current to the aforesaid layer of conducting material.

These probes may be connected to a computer itself connected to the layer of conducting material and to a source of electric current supply.

BRIEF DESCRIPTION OF THE DRAWINGS

The invention will be better understood and other objects, characterizing features, details and advantages thereof will appear more clearly as the following explanatory description proceeds with reference to the accompanying diagrammatic drawings given by way of non-limiting examples only illustrating several presently preferred specific embodiments of the invention and wherein:

FIG. 1 is a view of a tube according to the invention after shaping thereof, in cross-section extending at right angles to the tube axis;

FIG. 2 is a top view of a portion of this tube before shaping and diagrammatically showing an embodiment of the binding or interweaving of the glass fibers;

FIG. 3 is a view similar to FIG. 2 but showing another embodiment of the binding or interlacing of the glass fibers of the tube;

FIG. 4 is a very diagrammatic view illustrating the essential operating steps or phases to be performed for making this tube; and FIG. 5 is a view in axial half-section of the tube diagrammatically showing the various means used to control and adjust the heating temperature of the tube, i.e. the polymerization of the resin incorporated into the concentric layers constituting the said tube.

DESCRIPTION OF THE PREFERRED EMBODIMENTS

According to an exemplary embodiment and with reference more particularly to FIGS. 1 and 5, a tube or pipe carried out according to the invention essentially comprises four layers of material made fast with each other owing to the incorporation of a synthetic resin and which are the following from the inside of the tube up to the outside thereof :

an impervious sleeve-like layer made from a suitable plastics material such for instance as based upon polyethylene, polypropylene or the like, this layer being designated by the reference numeral 1;

a first layer of glass fibers 2 which is made fast with the layer of impervious plastics material 1;

a layer 3 of electrically conducting material, this layer consisting preferably of a sleeve-like or jacket-shaped metal or as shown by a spirally shaped metal wire 4 interposed between the first layer of glass fibers 2 and a second layer of glass fibers 5 which forms the outer portion of the tube.

A suitable synthetic resin such for instance as a polyester or polyurethane resin is incorporated into the layers 2, 3 and 5 which are thus rigidly connected or bonded to each other and also to the inner sleeve or jacket 1 made from impervious plastics material.

As seen on FIG. 2, the glass fibers 5a of the layer 5 (and also those of the layer 2 if it is desired) are orthogonally interlaced or interwoven and oriented along the grain or in parallel relation to the centreline axis X—X' of the tube. These glass fibers may, according to another embodiment and as seen on FIG. 3, be interlaced or bound orthogonally but in skew or inclined relationship with respect to the centreline axis X—X' of the tube.

Without leaving the scope of the invention, it is of course possible to contemplate the provision of any suitable thickness to the plastics layer 1 and to both glass fiber layers 2 and 5 as well as any suitable orientation of the glass fibers within the resin in accordance with the characteristics of mechanical strength which should desirably be obtained, i.e. eventually in accordance with the specific use of the tube which is desired.

The method of manufacturing the tube which has just been described will now be explained with reference more particularly to FIGS. 4 and 5, the said method allowing a continuous and controlled production.

As seen on FIG. 4, there is used a mandrel shown diagrammatically at M which is at first covered or lined with a layer of plastics material adapted to form the impervious layer 1 previously described.

Then is effected a circular weaving in a continuous fashion of the first layer of glass fibers 2 and then of the second layer of glass fibers 5, it being understood that before weaving the second layer 5, a metal wire 4 has been spirally wound about the layer 2. It should be noted that, for the sake of greater simplicity, all the above layers have not been shown on FIG. 4 which diagrammatically illustrates one single layer only which actually comprises the successive concentric layers and eventually forms the tube or pipe T.

After the circular weaving step, the tube T which is soft and visible at T' on FIG. 4 issues from or leaves the mandrel M and is carried into an evacuated case or box C in which resin is injected. The tube T' will therefore be impregnated or soaked with resin with respect to the layers 2, 3 and 5, the said resin interconnecting the said layers with the impervious sleeve or jacket of plastics material 1.

Then is carried the shaping of the tube T' issuing from the impregnation box C, this shaping being carried out as known per se through inflation or expansion so that the tube assumes the substantially circular shape visible at T" on FIG. 4.

At last, the tube T" is heated by means of the device Y which is better seen on FIG. 5 and which will be described now.

The heating is performed by the metal wire 4 which not only reinforces or strengthens the tube but also plays the part of a heating resistor fed with electric current by a course of supply S.

More specifically, the tube T comprises a plurality of thermal sensors or probes 6 provided on the outer periphery or even incorporated into the layer 5 of glass fibers. These probes are connected to a recording measuring apparatus Z which is connected to a computer O connected to the source S supplying the metal wire resistor 4 with electric current.

Thus, the computer O according to the data transmitted by the apparatus Z may control or adjust the supply of electric current to the heating wire resistor 4.

It should be pointed out that the apparatus Z may select the coldest probe so as to make sure the temperature elevation adopted on the considered spot. It is therefore understandable that the polymerization of the resin will be effected at any point in a homogeneous manner over the whole length of the tube leaving the mandrel M.

It has therefore been provided according to the invention, a tube or pipe the manufacture of which may be carried out continuously in a very quick way, which exhibits the desired qualities of imperviousness owing to the provision of the plastics sleeve or jacket 1 towards the inside and which exhibits high and homogeneous mechanical characteristics throughout its length owing in particular to the absence of any fittings or connections through sewing or welding.

The invention is of course not at all limited to the embodiment described and shown which has been given by way of example only.

Thus, the nature of the resin, the relative thicknesses of the concentric layers forming the tube and the nature or shape of the electrically conducting material interposed between the layers of glass fibers may be of any kind without leaving the scope of the invention.

Therefore, the invention comprises all the technical equivalents of the means described as well as their combinations if same are carried out according to its gist and within the scope of the appended claims.

What is claimed is:

1. A tube for carrying any fluid and comprising from the inside towards the outside thereof;
   a layer of impervious plastics material;
   a first tubular layer of continuously circularly woven glass fibers connected to the aforesaid layer;
   a metal wire conductor spirally wound about said first layer;
   a second tubular layer of continuously circularly woven glass fibers about said conductor and said first layer;
   said conductor and said first and second tubular layers being impregnated with resin so as to be connected together with said impervious layer; and
   said glass fibers of said first and second tubular layers are orthogonally bound or interlaced in skew relationship or along the grain with respect to a centerline axis of said tube

* * * * *